United States Patent [19]

Ferdinand et al.

[11] Patent Number: 4,484,608
[45] Date of Patent: Nov. 27, 1984

[54] ROUTER TABLE

[75] Inventors: Irwin J. Ferdinand, Glencoe; Richard Sylvan, Glenview; Michael Peterson, Evanston, all of Ill.

[73] Assignee: Hirsh Company, Skokie, Ill.

[21] Appl. No.: 435,759

[22] Filed: Oct. 21, 1982

[51] Int. Cl.³ .............................................. B27C 5/10
[52] U.S. Cl. ......................... 144/134 B; 144/134 D; 408/135; 409/97; 409/110
[58] Field of Search ................... 144/1 R, 1 E, 134 R, 144/134 A, 134 D, 136 R, 136 C, 137, 145 R, 145 A, 145 C; 408/135; 409/97, 110

[56] References Cited

U.S. PATENT DOCUMENTS

| | | |
|---|---|---|
| 1,696,032 | 12/1928 | Glover . |
| 1,747,418 | 2/1930 | Bishop et al. . |
| 1,829,393 | 10/1931 | Carter . |
| 2,035,283 | 3/1936 | Schroeder . |
| 2,404,053 | 7/1946 | Glover, Jr. . |
| 2,543,917 | 3/1951 | Lloyd . |
| 2,821,875 | 2/1958 | Buck . |
| 2,887,911 | 5/1959 | Bunting .............................. 408/135 |
| 2,896,677 | 7/1959 | Payzant . |
| 3,013,473 | 12/1961 | Straus . |
| 3,099,298 | 7/1963 | Bellini . |
| 3,242,773 | 3/1966 | Van Praag . |
| 3,550,481 | 12/1970 | Jensen . |
| 3,724,963 | 4/1973 | Stadtmiller . |
| 3,783,915 | 1/1974 | Bryden . |
| 3,923,086 | 12/1975 | Spohn, Jr. . |
| 4,044,805 | 8/1977 | Gronhalz . |
| 4,132,254 | 1/1979 | Shockovsky . |
| 4,197,887 | 4/1980 | Groves . |
| 4,281,694 | 8/1981 | Gorman . |
| 4,284,373 | 8/1981 | Wolff . |
| 4,397,342 | 8/1983 | North ................................. 144/1 F |

OTHER PUBLICATIONS

Schieber Machine Company, Schieber 280 Router Mate literature.
Shopsmith Router Arm Owners Manual, Copyright 1979.
1982 Sears Catalog, p. 736.

Primary Examiner—W. D. Bray
Attorney, Agent, or Firm—Dressler, Goldsmith, Shore, Sutker & Milnamow, Ltd.

[57] ABSTRACT

A device for support of a portable router above a work table so as to convert a portable router into a pin router assembly. The device includes a mounting plate which is directly attached to the base portion of the router. The mounting plate is formed integral with a support carriage assembly that is mounted in a housing assembly to permit the router to be smoothly and accurately positioned above the work table in preselected positions. A guide pin is carried in a block assembly that is received in the work table in a manner which permits the adjustment of the guide pin into alignment with the router chuck.

20 Claims, 11 Drawing Figures

ROUTER TABLE

DESCRIPTION

1. Technical Field of the Invention

This invention relates to an apparatus for support of a portable router above a work table and more particularly to such an apparatus which converts a portable router into a pin router assembly.

2. Background of the Invention

A portable router is a high-speed electric power tool that has a revolving vertical spindle and chuck for receiving a cutter bit. Such routers are in wide spread use and it is generally known that auxilliary means may frequently be employed to provide assistance in guiding the router with respect to the workpiece. Examples of such auxilliary means are disclosed in U.S. Pat. Nos. 4,044,805, 4,132,254, 4,197,887 and 4,281,694. Various devices are also available for support of portable tools, such as electric drills, over a work table. An example of such a device is disclosed in U.S. Pat. No. 4,284,373.

Commercial-grade table-type pin routers are available which include a router unit mounted for vertical movement above a work table. A guide pin extends upward from a work surface of the work table in alignment with the router bit. The guide pin is utilized to guide the movement of a workpiece which is attached to a fixture having grooves cut thereinto and in which the pin travels. This technique, known as pin routing, virtually eliminates the possibility of error since the travel of the workpiece is controlled by the guide pin. Such commercial-type pin routers are quite expensive and space consuming and therefore not generally used by the casual craftsman.

A device is available which may be attached to the vertical spindle of a conventional power tool, i.e. a drill press, which receives a portable router in a manner which permits movement of the router towards and away from a work surface. Such a device is disclosed in U.S. Pat. No. 3,783,915. The commercial embodiment of this device is manufactured by Shopsmith, Inc. under the trade name Shopsmith Router Arm. This commercial embodiment includes a guide pin block assembly which is rigidly received within a recess in the work table and is provided with an opening for receipt of a guide pin. The guide pin block assembly does not permit the adjustment of the alignment of the guide pin relative to the router bit. The device disclosed in the patent and the commercial embodiment includes a bracket arrangement which clamps around the motor housing of the router. It is therefore necessary to remove the router motor from its base in order to attach the router to the device. It further may be necessary to remove other parts of the router, i.e. handles, in order to mount some commercially available routers. This device is of no use to a craftsman who may own a portable router but does not own a power tool having a vertical spindle to which such device may be attached.

Another device is manufactured by Schreiber Machine Co. under the trade name Schreiber 280 Router Mate. This device includes collars to receive portable routers of various manufacturers. The up and down movement of the router relative to a work surface is controlled by an air pressure cylinder. This device is expensive and, accordingly, not generally affordable by the casual craftsman. Further, this device suffers from some of the deficiencies mentioned immediately hereinabove.

There is a present need for a device to receive and support a portable router above a work table which is a self containing unit not requiring attachment to another power tool. It would be advantageous for this device to be able to receive portable routers of various manufacturers without requiring extensive disassembly of the router. It would also be advantageous for this device to provide means to receive a guide pin assembly in the work table in a manner which permits adjustment of the guide pin in various directions. It would further be advantageous for this device to be able to smoothly and accurately raise and lower the router above the work table and lock the router in a preselected position. It would also be desirable for this device to be compact in design and inexpensive to manufacture to permit the casual craftsman to utilize the device.

SUMMARY OF THE INVENTION

In a preferred embodiment of the assembly of the present invention, a work table is provided having a generally horizontal upper work surface. A support arm assembly is mounted to the work table and includes an upper support arm portion having an inner end which extends over a central portion of the work surface. A carriage mounting housing assembly is secured to the inner end of the support arm portion, for support of a carriage assembly mounted thereto, in a manner which permits selective vertical movement of the support carriage assembly relative to the work surface. A generally horizontal mounting plate, associated with the support carriage assembly, has a plurality of radially extending slots formed therein for mounting the base portion of a portable router directly thereto. The radial slots are oriented to accommodate portable routers having mounting holes in various orientations.

In the preferred embodiment, a guide pin block assembly is releasably received within a recess in the central portion of the work table for receipt of a guide pin which extends above the work surface. The guide pin block assembly includes a bottom plate which is secured to the work table and is movable along a first axis and top guide pin plate which is secured to the bottom plate and movable relative thereto along a second axis, which second axis is perpendicular to the first axis. The guide pin block assembly thus permits the adjustment of the guide pin along either of two perpendicular axes.

The arrangement for mounting the support carriage assembly to the carriage mounting housing assembly includes a dovetail shaped slide portion that is associated with the support carriage assembly and that is slidably received in a dovetail shaped recess in the carriage mounting housing assembly. A geared rack is mounted to the support carriage assembly and meshes with a spur gear journalled for selective rotation within the carriage mounting housing assembly.

In order to facilitate the controlled movement of the slide portion within the recess, a wear surface insert is positioned between the slide portion and the corresponding surfaces defining the recess. A bearing plate is positioned between a portion of the wear surface insert and a surface of the recess to serve as part of a means to adjust the sliding friction between the wear surface insert and the slide portion and to lock the slide portion in a fixed position within the recess. The adjusting means further includes a locking knob, having a threaded shaft associated therewith, which extends through the carriage mounting housing assembly such that upon rotation thereof the end of the shaft applies a clamping pressure to the bearing plate. Also, a plurality of set screws extend through the carriage mounting housing assembly into contact with the bearing plate to permit selective adjustment of the sliding friction between the wear surface insert and the slide portion over preselected portions thereof.

Numerous other advantages and features of the present invention will become apparent from the following detailed description of the invention and of one embodiment thereof, from the claims and from the drawings.

BRIEF DESCRIPTION OF THE DRAWINGS

In the accompanying drawings forming part of the specification and in which like numerals are employed to designate like parts throughout the same, and wherein.

DESCRIPTION OF THE PREFERRED EMBODIMENT

While this invention is susceptible of embodiment in many different forms, there is shown in the drawings and will herein be described in detail a preferred embodiment of the invention. It should be understood, however, that the present disclosure is to be considered as an exemplification of the principles of the invention and is not intended to limit the invention to the specific embodiment illustrated.

The precise shapes and sizes of the components herein described are not essential to the invention unless otherwise indicated.

For ease of description, the apparatus of this invention will be described in a normal operating position, and terms such as upper, lower, horizontal, etc., will be used with reference to its normal operating position. It will be understood, however, that the apparatus of this invention may be manufactured, stored, transported, used and sold in an orientation other than the normal operating position described.

Figures 1, 2, 3, 4:
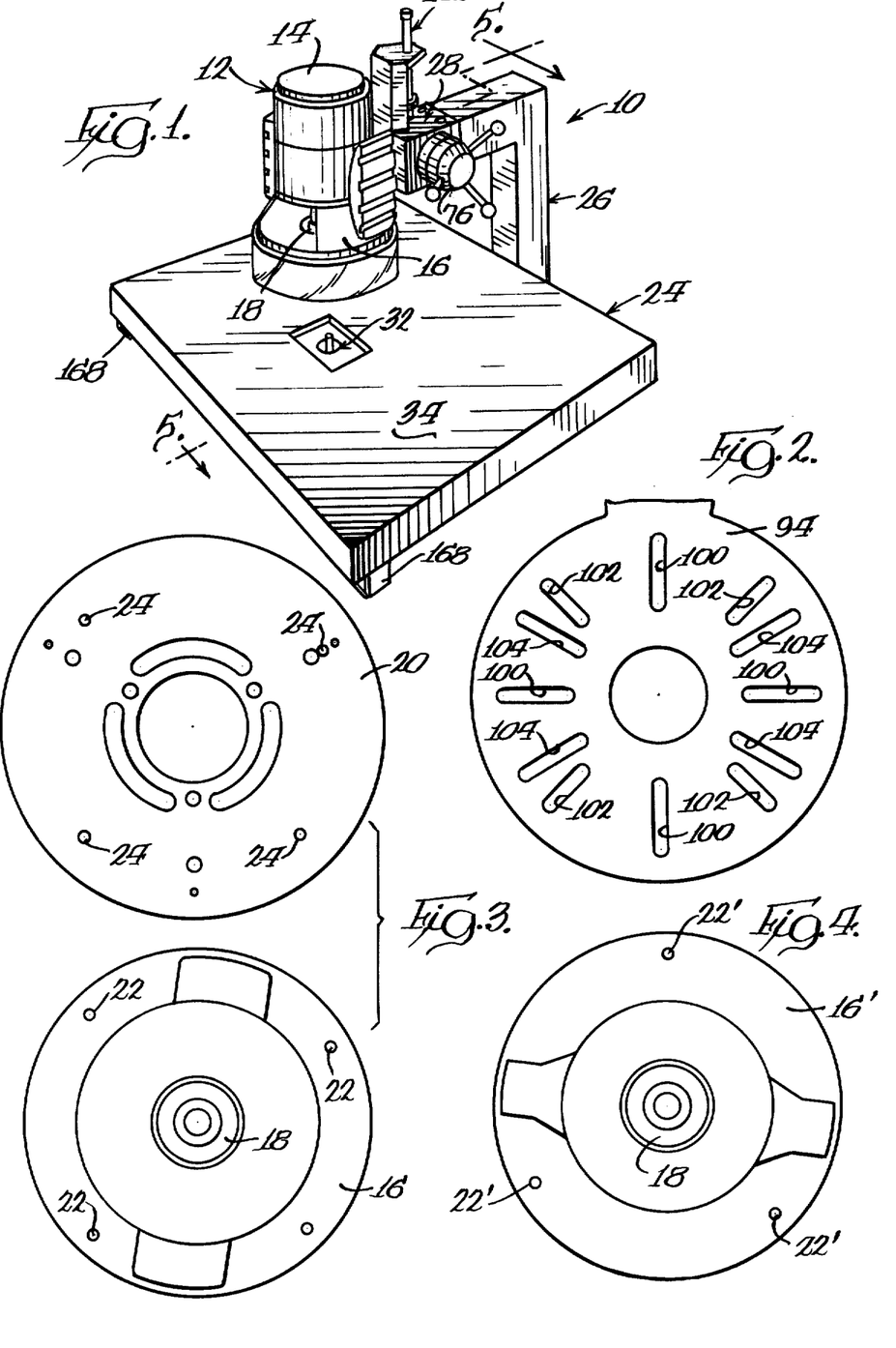
FIG. 1 is a perspective view of the router table device or assembly of the present invention showing a portable router mounted thereon in a raised position above a guide pin.
FIG. 2 is an enlarged bottom plan view of the mounting plate portion of the support carriage assembly of the device illustrated in FIG. 1.
FIG. 3 shows enlarged bottom plan views of the sole plate and the base portion of one embodiment of a portable router of a type to be attached to the assembly illustrated in FIG. 1.
FIG. 4 is an enlarged bottom plan view of a base portion of a second embodiment of a portable router of a type to be attached to the assembly illustrated in FIG. 1.

FIG. 1 illustrates the pin router table device or assembly of the present invention wherein the assembly is designated generally by the numeral 10. The assembly 10 is adapted to accommodate most types of conventional portable routers that are currently commercially available in the United States of America. One such type of portable router is designated generally by numeral 12 in FIG. 1. The routers typically have a motor housing 14 which houses a high-speed motor (not shown), a base portion 16 which extends downward from the motor housing, a sole plate 20 (visible in FIG. 3 only) which is mounted to the base portion 16, and a collet-type chuck 18 which is rotated by the motor shaft and which releasably receives a router bit.

Referring to FIGS. 3 and 4, two exemplary embodiments of the base portion 16, which are present on commercial routers, are shown at 16 and 16' respectively. The base portions 16 and 16' are of generally similar form with the bottom surfaces having threaded mounting holes 22 and 22' respectively formed therein. As is apparent from the figures, base portion 16 has four mounting holes 22, which are oriented along radial axes spaced 90° apart, and base portion 16' has three mounting holes 22', which are oriented along radial axes spaced 120° apart.

As illustrated in FIG. 3, the sole plate 20 for router base portion 16 is formed with holes 24, which are in alignment with the holes 20 in base portion 16, for receipt of suitable threaded fasteners therethrough so as to secure sole plate 20 to base portion 16. The other openings shown in FIG. 3 are for various purposes not relevant to the understanding of the present invention. Although not specifically shown in the drawings, the sole plate which is attached to base portion 16' is similarly formed with holes therein in alignment with the holes 20'.

As seen in FIG. 1, the pin router table 10 includes a work table 24, a support arm assembly 26, a carriage mounting housing assembly 28, a support carriage assembly 30, and a guide pin block assembly 32.

Work table 24 is generally of rectangular shape and preferably of a fiberboard material having a plastic laminate work surface 34 applied thereto. A generally rectangular recess 36 (visible in FIG. 5) is formed into a central portion of the work table for receipt of the guide pin block assembly 32, in a manner which will be hereinbelow further discussed. Also, holes are formed through work table 24 for mounting of various elements thereto as discussed hereinafter.

Figures 5, 6:
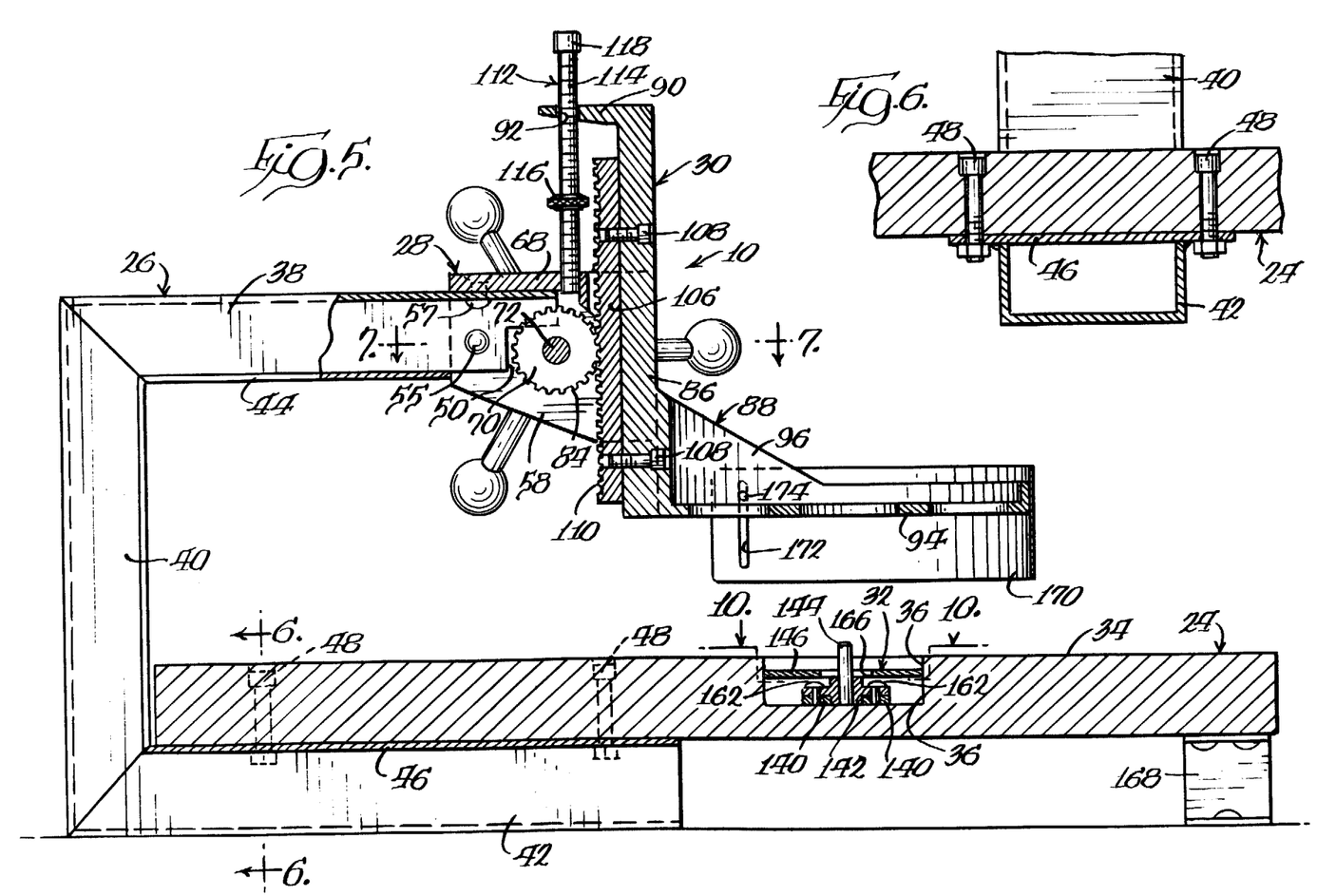
FIG. 5 is an enlarged cross-sectional view taken generally along the multiple planes 5—5 in FIG. 1, with the portable router removed from the assembly.
FIG. 6 is a fragmentary, partial cross-sectional view taken along the plane 6—6 in FIG. 5.

Referring to FIGS. 1, 5 and 6, support arm assembly 26 is a generally C shaped channel member having an upper support arm portion 38, a vertical connecting arm portion 40, and a base support arm portion 42. The arm portions 38, 40 and 42 are weld mitered at the respective corners connecting the portions together. An angular cover plate 44 is preferably welded in covering relationship to the edges of arm portions 38 and 40 and a cover plate 46 is welded across the edges of arm portion 42. As best seen in FIG. 6, cover plate 46 extends a short distance beyond the edges of arm portion 42 and is secured to work table 24 by a plurality of fasteners 48 which extend through the work table and the cover plate. The heads of fasteners 48 are preferably recessed into the work surface 34. The inner end of cover plate 44 terminates short of the inner end of upper support arm portion 38 and the inner end of arm portion 38 is notched at 50, for reasons which will become hereinbelow more apparent. In this manner support arm assembly 26 is secured to work table 24 with the inner end of support arm 38 positioned above a central portion of the work table 24.

Figures 7, 8:
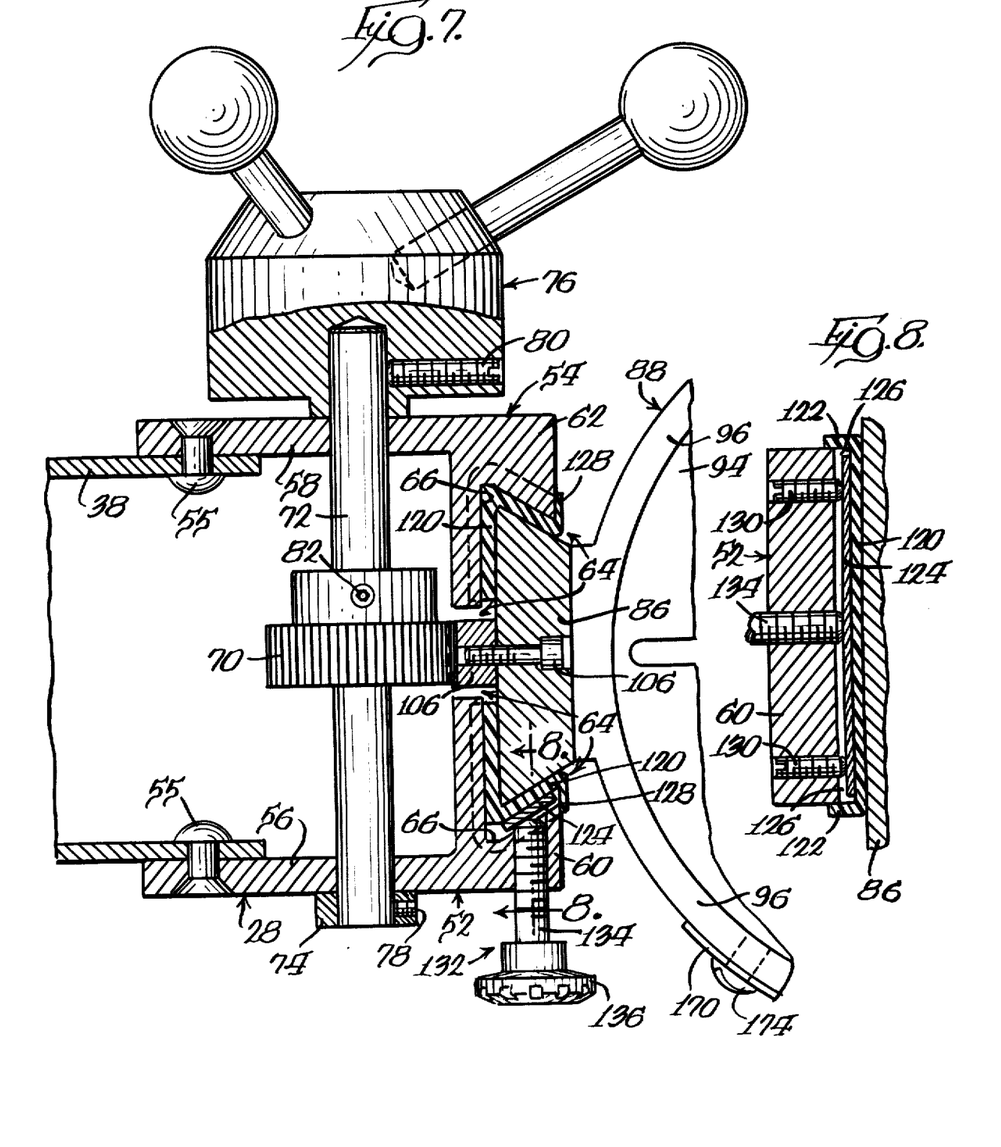
FIG. 7 is an enlarged, fragmentary, partial cross-sectional view of the assembly taken along the plane 7—7 in FIG. 5.
FIG. 8 is a fragmentary, cross-sectional view of the assembly taken along the plane 8—8 in FIG. 7.

Carriage mounting housing assembly 28 is secured to the inner end of upper support arm portion 38. Referring to FIGS. 5 and 7, assembly 28 includes a pair of generally L shaped members 52 and 54, which are attached to arm portion 38 by fasteners 55. Members 52 and 54 respectively have side portions 56 and 58, which are respectively secured to the sides of the inner end of arm portion 38 adjacent to notch 50, and end portions 60 and 62, which extend towards each other and define an open space 64 therebetween. The outer surfaces of end portions 60 and 62 are formed with cooperating cut-outs so as to define a dovetail shaped recess 66 in the inner end portion of assembly 28.

A top plate 68 (FIG. 5) is secured to the top of the inner end of arm portion 38 in a closing relationship to members 52 and 54 (FIG. 7) by fasteners 57 (FIG. 5). Although not specifically shown, the inner edge of top plate 68 is formed with a cut-out which is in registration with, and cooperates with, opening 64. The upper edges of members 52 and 54 are preferably flush with the upper surface of plate 68.

A spur gear 70, secured to a shaft 72 by a set screw 82, is positioned within carriage mounting housing assembly 28 for rotation with the shaft 72 about a horizontal axis. The shaft 72 is journaled for rotation in openings in members 52 and 54 and is held in place by a collar 74 on one side adjacent member 52 and on the other side adjacent member 54 by a control knob and handle assembly 76, which are respectively secured to shaft 72 by set screws 78 and 80. The gear teeth 84 (FIG. 5) of spur gear 70 preferably extend a short distance into opening 64.

Support carriage assembly 30 is mounted in carriage mounting assembly 28 in a manner which permits selective vertical movement of assembly 30 relative to work table 24. Referring to FIGS. 5 and 7, support carriage assembly 30 includes a slide portion 86 which is slidably received in recess 66 and includes a router support portion 88 which supports router 12. Slide portion 86 is a generally vertical dovetail shaped structure which is received in recess 66 and is dimensioned slightly smaller than recess 66 for reasons which will hereinbelow become apparent. The upper end of slide portion 86 has a flange portion 90 which extends over assembly 28 and has an opening 92 therethrough.

Support portion 88 includes a generally horizontal mounting plate 94 which extends from the lower edge of slide portion 86 over recess 36 in work table 24. Support portion 88 also includes an upstanding curved portion 96, which extends from an intermediate point on slide portion 86 and is inclined downwardly and terminates at points on the upper surface of mounting plate 94 that if connected would divide the plate 94 approximately in half.

Referring to FIG. 2, mounting plate 94 is provided with a plurality of radially extending slots 100, 102 and 104 formed therein for mounting the base portion 16 of router 12 thereto. The specific orientation of the slots 100, 102 and 104 in mounting plate 94 is designed so as to permit the mounting of the base portions of most commercially available routers directly to the plate 94 by use of the openings 22 in the base portion. Accordingly, in order to provide such flexibility, a unique arrangement of slots are provided through plate 94. In this regard, a first set of four radially extending slots 100 are formed through plate 94 which are along axes oriented 90° apart. A second set of four radially extending slots 102 are formed through plate 94 which are along axes oriented 45° from the axes of the slots 100. A third set of four radially extending slots 104 are formed through plate 94 which are along axes oriented 30° on either side of the pair of axes through the two opposing slots 100 which extend parallel to the rear edge of work table 24. The specific arrangement of slots 100, 102, and 104 permits the mounting of router base portions which have mounting holes oriented 120° apart (as in FIG. 4) in either of two orientations, of router base portions having mounting holes oriented 90° apart (as in FIG. 3) in either of four orientations, and of router base portions having mounting holes oriented 45° apart (not shown) in either of eight orientations. It is desirable to permit multiple mounting orientations so as to permit the router to be mounted in a position which is convenient to the various router controls. In most instances, the fasteners provided by the router manufacturer to attach the sole plate to the router base portion may be used, after removing the sole plate, to mount the base portion directly to the mounting plate 94 through the appropriate slots in plate 94 and into the holes 22 in the base portion 16.

Referring again to FIGS. 5 and 7, a vertically extending gear rack 106 is secured to slide portion 86 in a facing relationship to spur gear 70 by a pair of set screws 108. Gear rack 106 extends into opening 64 and has gear teeth 110 which mesh with the teeth 84 on spur gear 70. The rotation of assembly 76 and shaft 72 rotates gear 70, which rotation is effectively translated into vertical movement of gear rack 106 and support assembly 30 attached thereto. Set screws 108 preferably extend into the teeth 110 of rack 106 to serve as stops defining the limits of vertical movement of rack 106 relative to gear 70.

As best seen in FIG. 5, a stop rod assembly 112 is provided to selectively control the extent of the downward movement of support assembly 30. Stop rod assembly 112 includes a generally vertical threaded rod 114 which is threadedly received in a threaded opening in plate 68 at one of its ends and extends loosely through opening 92 in flange portion 90 at its other end. A threaded knurled stop knob 116 is received about rod 114 and is selectively moveable between plate 68 and flange portion 90. As support assembly 30 is lowered, the lower surface of flange portion 90 contacts the stop 116 and prevents further lowering of the support assembly. By adjusting the relative position of stop knob 116 on rod 114 a lower limit of vertical movement of support assembly 30 may be accurately set. A cap 118 is attached to the upper end of rod 114 to preclude the flange portion 90 from extending upward beyond the upper end of rod 114.

In order to facilitate movement of the slide portion 86 within recess 66, a pair of vertically extending wear surface inserts 120 are positioned between the sliding surfaces of slide portion 86 and the cooperating surface of recess 66, as best seen in FIGS. 7 and 8. Wear surface inserts 120 are generally Z shaped in horizontal cross-section, extend along the entire vertical length of recess 66, and include lip portions 122 (FIG. 8) which wrap around the top and bottom surfaces of the end portions 60 and 62 of members 52 and 54, respectively. In accordance with the preferred embodiment, the wear surface inserts 120 are made from a acetal homopolymer material such as that sold under the trademark Delrin in the United States of America by E. I. DuPont de Nemours & Company, Nemours Building, Wilmington, Del., however alternative materials having similar properties may be used, such as for example a polytetrafluoroethylene polymer such as that sold under the trademark Teflon in the United States of America by the same company.

A bearing plate 124 is positioned between insert 120 and the surface of end portion 60 of member 52 which defines the angled section of recess 66. Bearing plate 124 extends along substantially the entire vertical length of slide portion 86 and is retained in a pocket 126 in recess 66 defined by lip portions 122 and leg portions 128 of insert 120. A pair of set screws 130 are threadedly received through openings adjacent the upper and lower ends of end portion 60, such that the inner ends thereof are in contact with bearing plate 124. By tightening and loosening set screws 130, the sliding friction between the slide portion 86 and the wear surface inserts 120 may be selectively decreased or increased in proportion to the inward pressure exerted by the bearing plate 124.

A locking knob assembly 132 extends through end portion 60 to selectively lock the slide portion 86 in recess 66. Locking knob assembly 132 includes a threaded shaft 134 which extends through a threaded opening in end portion 60 such that the inner end thereof is in facing relationship with a central portion of bearing plate 124. The outer end of shaft 134 is attached to a control knob 136. In a similar manner as with regards to set screws 130, the inward movement of the inner end of shaft 134 into contact with bearing plate 124 applies inward pressure to plate 124 which increases the sliding friction between the slide portion 86 and the inserts 120. Upon application of sufficient pressure to plate 124, the slide portion 86 will be locked in a fixed position within recess 66. It should be pointed out that the set screws 130 are intended for use as a fine adjustment to the smooth sliding movement of the slide portion 86, whereas, the locking assembly 132 is intended for use as the means to wedge the slide portion 86 into a fixed position within recess 66.

Figure 9:
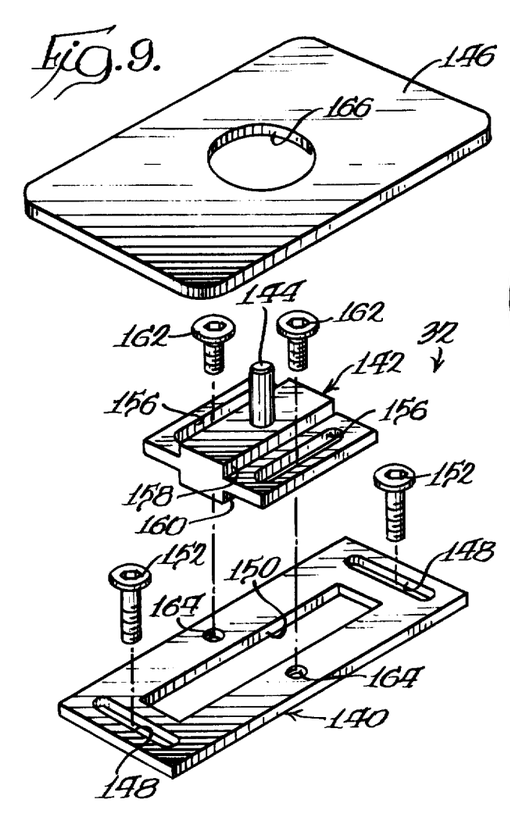
FIG. 9 is an enlarged, exploded, perspective view of the guide pin block assembly in accordance with the invention and which is also partially visible in FIG. 1.
Figure 10:
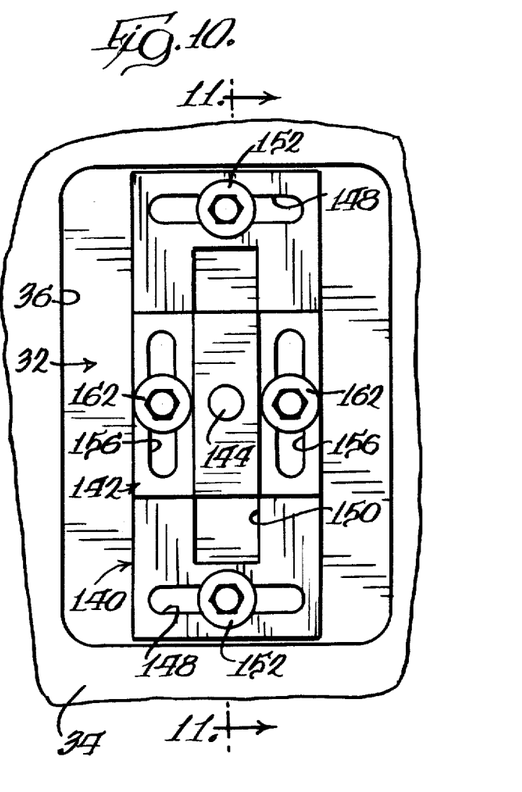
FIG. 10 is an enlarged, fragmentary, cross-sectional view taken along the multiple planes 10—10 in FIG. 5.
Figure 11:
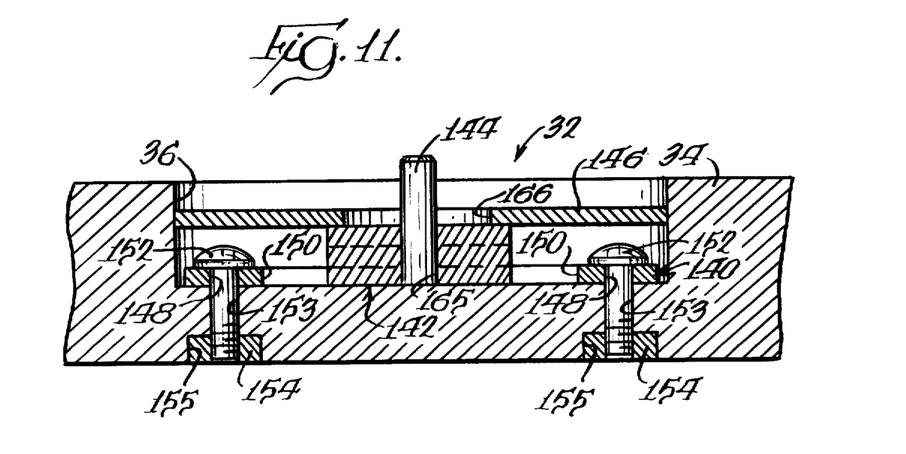
FIG. 11 is a fragmentary, cross-sectional view taken along the plane 11—11 in FIG. 10.

As best illustrated in FIGS. 9-11, a unique guide pin block assembly 32 is received within recess 36 in work table 24. Assembly 32 includes a bottom plate 140, a top guide pin plate 142 which receives the guide pin 144, and a cover plate 146. It is the function of assembly 32 to support the guide pin 144 in a manner which permits the selective positioning thereof relative to the router bit in the router 12. Bottom plate 140 is of generally rectangular shape and is formed with a pair of elongated slots 148 adjacent its ends. A generally rectangular elongated opening 150 is formed lengthwise through plate 140 between slots 148. Bottom plate 140 is secured to the bottom surface of recess 36 by threaded button head socket cap screws 152 which each extend downwardly through a corresponding slot 148 and through apertures 153 in the work table 24. The screws 152 are held in place by nuts 154 retained against rotation in bores 155.

The top guide pin plate 142 is a generally square shaped member whose sides are substantially equal in length to the width of plate 140. A pair of elongated slots 156 are formed adjacent the opposing sides of plate 142 which extend generally perpendicular to slots 148. Plate 142 is further formed with an upwardly extending elongated center portion 158 and a downwardly extending elongated center portion 160, as best illustrated in FIG. 9. Portions 158 and 160 extend generally parallel to slots 156 and have a width slightly less than the width of elongated opening 150 in plate 140. Top guide pin plate 142 is secured to bottom plate 140, such that the downwardly extending elongated center portion 160 is received in opening 150, by threaded button head socket cap screws 162 which extend through slots 156 and are received in threaded holes 164 in plate 140. An opening 165 extends through the central portions 158 and 160 of plate 142 for receipt of guide pin 144 therein, such that the upper end of the pin extends above the plane of the work surface 34, as best seen in FIG. 11.

The guide pin 144 is not secured in plate 142 and may be easily removed so that the router table 10 can be used without the pin if desired.

From the above description of guide pin block assembly 32, it will be apparent that, upon loosening screws 152, the bottom plate 140, and the top guide pin plate 142 and pin 144 positioned therein, may be moved within recess 36 in a direction defined by the horizontal axes passing through slots 148. Further, upon loosening screws 162, the top guide pin plate 142 and the pin 144 positioned therein, may be moved in a direction defined by the horizontal axes passing through slots 156, with central portion 160 sliding within opening 150. It is thereby possible to accurately adjust the position of the guide pin 144 in either of two perpendicular directions to compensate for manufacturing tolerances or a situation in which the base portion 16 of the router must be mounted on the mounting portion 94 in an off-centered relationship. This permits accurate positioning of the guide pin 144 relative to the chuck 18 of the router 12.

A cover plate 146, having an opening 166 formed therein, is supported upon plate 142 within recess 36 in covering relationship thereto, such that its upper surface is recessed a short distance below the work surface 34. The large diameter of opening 166 permits the selective adjustment of guide pin 144 as discussed above.

As best illustrated in FIG. 5, a clear plastic safety guard 170 is mounted to the bracket portion 96 and extends around and downwardly from mounting portion 94. Guard 170 is provided with a vertically elongated slot 172, which receives a winged bolt 174 extending therethrough and into bracket portion 96, so as to permit vertical adjustment of the guard in a well known manner.

As best illustrated in FIGS. 1 and 5, a pair of table mounting leg brackets 168 are secured to the underside of the work table 24 adjacent the front corners thereof to prevent the work table from tipping forward.

The router table 10, as hereinabove described, is a self-contained unit which converts a portable router into a pin router assembly. The specific arrangement of mounting plate 94 facilitates the mounting of portable routers of various manufacturers without requiring extensive disassembly of the router. The guide pin assembly 32 facilitates the adjustment of the guide pin into alignment with the router chuck. The router table 10 is provided with a unique support carriage arrangement which permits the router to be smoothly and accurately positioned above the work surface in preselected positions. All of these features are provided in a device which is compact in design and inexpensive to manufacture so as to meet the needs of the casual craftsman.

From the foregoing, it will be observed that numerous variations and modifications may be effected without departing from the true spirit and scope of the novel concepts of the invention. It is to be understood that no limitation with respect to the specific apparatus illustrated herein is intended or should be inferred. It is, of course, intended to cover by the appended claims, all such modifications as fall within the scope of the claims.

What is claimed is:

1. A router table for support of a portable router above a work surface, comprising:
   (a) a work table having a generally horizontal upper work surface;
   (b) a support arm assembly secured to said work table, said support arm assembly including an upper support arm portion having an inner end which extends above a central portion of said work surface;
   (c) a carriage mounting housing assembly secured to said inner end of said upper support arm portion, said carriage mounting assembly having a dovetail shaped recess defined in an end portion thereof, said end portion having a vertically extending opening communicating said recess with a cavity defined within said carriage mounting housing assembly;
   (d) a spur gear positioned within said cavity for rotation about a generally horizontal axis in facing relationship to said opening;
   (e) a support carriage assembly including a dovetail shaped slide portion slidably received within said recess;
   (f) a geared rack mounted to said slide portion so as to extend into said opening and mesh with said spur gear such that rotational movement of said spur gear is translated into vertical movement of said support carriage assembly;
   (g) a wear surface insert positioned between said slide portion and a surface of said recess so as to facilitate controlled vertical movement of said slide portion within said recess;
   (h) a bearing plate positioned between a portion of said wear surface insert and a surface of said recess;
   (i) locking means for selectively applying inward pressure to said bearing plate so as to selectively clamp said slide portion within said recess and thereby prevent vertical movement of said slide portion within said recess; and
   (j) a mounting means associated with said support carriage assembly for attachment of a router thereto above said work surface.

2. The router table as defined in claim 1 wherein said locking means comprises a locking knob having a threaded shaft which is threadedly received through a threaded opening in said carriage mounting housing assembly such that rotation of said threaded shaft is effective to extend the inner end of said threaded shaft into contact with said bearing plate and apply a selected clamping pressure thereto.

3. The router table as defined in claim 1 wherein at least one set screw extends through said carriage mounting housing assembly into contact with said bearing plate so as to permit selective adjustment of the sliding friction between said wear surface insert and said slide portion.

4. The router table as defined in claim 3 wherein said wear surface insert is made from a acetal homopolymer material.

5. The router table as defined in claim 1 wherein said spur gear is mounted to a generally horizontal shaft which extends through said cavity in said carriage mounting housing assembly, said shaft having a handle member attached to one end thereof for selective rotation of said shaft and the spur gear mounted thereto.

6. The router table as defined in claim 1 further including a stop rod assembly for selectively controlling the vertical movement of said support carriage assembly relative to said carriage mounting housing assembly, said stop rod assembly comprising: a generally vertical rod having a lower end attached to said carriage mounting housing assembly and an upper end which extends through an opening in said support carriage assembly; and a threaded knob threadedly received by said rod and selectively movable between said carriage mounting housing assembly and said support carriage assembly.

7. The router table as defined in claim 1 wherein said support arm assembly comprises a generally C shaped channel member which defines said upper support arm portion, a connecting arm portion, and a base support arm portion which extends under and is secured to a bottom surface of said work table.

8. The router table as defined in claim 7 wherein said work table is rectangular and mounting leg brackets are secured to the bottom surface thereof adjacent the forward corners thereof, said mounting leg brackets having a height substantially equal to the height of said base support arm portion.

9. A router table for support of a portable router above a work surface, comprising:
   (a) a work table having a generally horizontal upper work surface;
   (b) a support arm assembly secured to said work table, said support arm assembly including an upper support arm portion which extends above and over said work surface;
   (c) a carriage mounting housing assembly secured to said upper support arm portion; and
   (d) a support carriage assembly movably mounted to said carriage mounting housing assembly so as to permit vertical movement of said support carriage assembly relative to said work surface, said support carriage assembly including a generally horizontal mounting plate extending over a portion of said work surface, said mounting plate having a central opening for accommodating the router chuck and bit, said mounting plate also including means associated therewith for accommodating attachment of the base portion of the router directly to said mounting plate.

10. The router table as defined in claim 9 wherein said mounting plate has a plurality of radially extending slots formed therein for receipt of fastening means therethrough which extend from mounting holes in the base portion of the router.

11. The router table as defined in claim 10 wherein said plurality of radially extending slots includes a first set of four slots which are along axes oriented 90° apart.

12. The router table as defined in claim 11 wherein said plurality of radially extending slots further includes a second set of four slots which are along axes oriented 45° from the axes of said first set of four slots.

13. The router table as defined in claim 12 wherein said plurality of radially extending slots further includes a third set of four slots which are along axes oriented 30° on either side of the axes of a pair of opposing slots of said first set of four slots.

14. A router table for support of a portable router above a work surface, comprising:
   (a) a work table having a generally horizontal upper work surface;
   (b) a support arm assembly secured to said work table, said support arm assembly including as upper support arm portion which extends above and over said work surface;
   (c) a carriage mounting housing assembly secured to said upper support arm portion;
   (d) a support carriage assembly for attachment of the router thereto mounted to said carriage mounting housing assembly above a central portion of said work surface so as to permit selective vertical movement thereof relative to said work surface; and
   (e) a guide pin block assembly mounted within a recess in said central portion of said work surface for support of a vertical guide pin therein, said guide pin block assembly permitting the selective adjustment of the location of said guide pin along at least either of two perpendicular axes.

15. The router table as defined in claim 14 wherein said guide pin block assembly comprises: a bottom plate movably secured within said recess by first fastener means which extend upward therefrom through a first pair of spaced parallel slots formed in said bottom plate; and a top guide pin plate movably secured to said bottom plate by second fastener means which extend through a second pair of spaced parallel slots formed in said top guide pin plate perpendicular to said first pair of spaced parallel slots and into openings in said bottom plate, said top guide pin plate having an opening formed therein for receipt of said guide pin, such that upon loosening of said first fasteners means said bottom plate and said top guide pin plate secured thereto are movable within said recess along a first axis and upon loosening of said second fastener means said top guide pin plate is movable relative to said bottom plate along a second axis substantially perpendicular to said first axis.

16. The router table as defined in claim 15 further including a cover plate positioned within said recess in covering relation thereto and having an opening formed therein for receipt of said guide therethrough.

17. The router table as defined in claim 16 wherein said opening in said cover plate is dimensioned to permit adjustment of said guide pin therein.

18. The router table as defined in claim 17 wherein the upper surface of said cover plate is recessed a short distance below said work surface.

19. The router table as defined in claim 15 wherein said bottom plate has an elongated opening formed therein positioned between and perpendicular to said first pair of spaced parallel slots and wherein said top guide pin plate has a downwardly extending elongated center portion parallel to said second pair of spaced parallel slots which is slidably received within said elongated opening.

20. The router table as defined in claim 19 wherein said top guide pin plate further includes an upwardly extending elongated center portion parallel to said second pair of spaced parallel slots and wherein said opening in said top guide pin plate which receives said guide pin extends through said upwardly extending center portion and through said downwardly extending center portion.

* * * * *